United States Patent
Lee (10) Patent No.: US 8,857,409 B2
(45) Date of Patent: Oct. 14, 2014

(54) METHOD FOR COMPENSATING FOR VALVE LIFT DEVIATION BETWEEN ENGINES EQUIPPED WITH CVVL MECHANISM

(75) Inventor: Joonsuck Lee, Ansan-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 607 days.

(21) Appl. No.: 13/189,293

(22) Filed: Jul. 22, 2011

(65) Prior Publication Data

US 2012/0116646 A1 May 10, 2012

(30) Foreign Application Priority Data

Nov. 4, 2010 (KR) .................. 10-2010-0109400

(51) Int. Cl.
- *F02D 13/00* (2006.01)
- *F01L 1/344* (2006.01)
- *F02D 13/02* (2006.01)
- *F01L 1/053* (2006.01)

(52) U.S. Cl.
CPC ......... *F02D 13/0207* (2013.01); *F01L 2800/00* (2013.01); *F01L 2001/0537* (2013.01); *F01L 2800/14* (2013.01); *F01L 2800/09* (2013.01); *Y02T 10/18* (2013.01); *F01L 2820/041* (2013.01); *F01L 1/3442* (2013.01)
USPC ........ 123/345; 123/382; 123/378; 73/114.32; 701/102

(58) Field of Classification Search
CPC .............. F02D 41/18; F02D 41/0002; F02D 2041/001; F02D 2041/002; F01L 2800/09; F01L 2800/14; F01L 2800/18

USPC ......... 123/321, 345, 346, 378, 389, 382, 391, 123/403, 404, 405; 73/114.32, 114.33; 701/102, 115
See application file for complete search history.

(56) References Cited

U.S. PATENT DOCUMENTS

| | | | | |
|---|---|---|---|---|
| 5,714,683 A | * | 2/1998 | Maloney | 73/114.33 |
| 5,753,805 A | * | 5/1998 | Maloney | 73/114.32 |
| 6,748,313 B2 | * | 6/2004 | Li et al. | 701/102 |

(Continued)

FOREIGN PATENT DOCUMENTS

| | | |
|---|---|---|
| JP | 2008-309119 B2 | 12/2008 |
| JP | 2009-085136 A | 4/2009 |
| KR | 10-2007-0005090 A | 1/2007 |

*Primary Examiner* — Thomas Moulis
(74) *Attorney, Agent, or Firm* — Morgan, Lewis & Bockius LLP (57) ABSTRACT

A method is provided for compensating for a valve lift deviation between engines equipped with a CVVL mechanism, in which the valve lift deviation is compensated for by an MAF sensor for measuring a reference air flow rate and an MAP sensor for measuring the pressure of an intake manifold. The method includes determining whether learning conditions for learning a valve lift deviation are met; after the determination, comparing a value MAP_MES measured by the MAP sensor and a modeled pressure MAP_MDL of a surge tank; if the MAP_MES value and the MAP_MDL value are different, learning the valve lift, and after the learning, calculating the final valve lift by adding the learned value of the valve lift to the basic valve lift characteristics. Various types of deviations in valve lift can be solved by using a learned value of valve lift deviation, the engines can have the same characteristics because a deviation in intake air flow rate is minimized by learning the valve lift of the engines, and the quality of the engine of the CVVL mechanism can be improved.

7 Claims, 6 Drawing Sheets

(56) References Cited

U.S. PATENT DOCUMENTS

| | | | |
|---|---|---|---|
| 6,755,182 B1* | 6/2004 | Kolmanovsky et al. | 123/478 |
| 6,851,304 B2* | 2/2005 | Cullen et al. | 73/114.32 |
| 6,851,409 B2* | 2/2005 | Machida et al. | 123/399 |
| 6,863,048 B2* | 3/2005 | Burkhard et al. | 123/325 |
| 6,871,617 B1* | 3/2005 | Winstead et al. | 123/90.11 |
| 6,871,632 B2* | 3/2005 | Henn et al. | 123/399 |
| 6,907,339 B2* | 6/2005 | Henn | 701/104 |
| 7,117,847 B2* | 10/2006 | Russell et al. | 123/361 |
| 7,194,998 B2 | 3/2007 | Fuwa et al. | |
| 7,219,004 B2* | 5/2007 | Kolmanovsky et al. | 701/104 |
| 7,290,527 B2* | 11/2007 | Russell et al. | 123/348 |
| 7,299,786 B2* | 11/2007 | Russell et al. | 123/322 |
| 7,359,791 B2* | 4/2008 | Borean et al. | 701/103 |
| 7,360,515 B2* | 4/2008 | Hoshino | 123/90.15 |
| 7,363,889 B2* | 4/2008 | Tsunooka et al. | 123/90.15 |
| 7,386,387 B2* | 6/2008 | Bauer et al. | 701/103 |
| 7,458,348 B2* | 12/2008 | Machida et al. | 123/90.16 |
| 7,565,236 B2* | 7/2009 | Turin et al. | 701/103 |
| 7,654,236 B2* | 2/2010 | Dingl et al. | 123/90.17 |
| 7,690,350 B2* | 4/2010 | Delp et al. | 123/345 |
| 7,881,856 B2* | 2/2011 | Shimizu | 701/104 |
| 7,975,672 B2* | 7/2011 | Kang et al. | 123/434 |
| 8,151,567 B2* | 4/2012 | Rollinger et al. | 60/602 |
| 8,155,862 B2* | 4/2012 | Nishimoto et al. | 701/103 |
| 8,165,784 B2* | 4/2012 | Okamoto et al. | 701/105 |
| 8,224,592 B2* | 7/2012 | De Cristofaro et al. | 702/45 |
| 8,364,383 B2* | 1/2013 | Delp et al. | 701/103 |
| 8,371,264 B2* | 2/2013 | Russell et al. | 123/321 |
| 8,473,182 B2* | 6/2013 | Suzuki et al. | 701/103 |
| 2005/0229884 A1* | 10/2005 | Kunz et al. | 123/90.17 |
| 2006/0054134 A1* | 3/2006 | Henn et al. | 123/325 |
| 2009/0164099 A1* | 6/2009 | Suzuki et al. | 701/103 |
| 2012/0117011 A1* | 5/2012 | Hashimoto et al. | 706/23 |

\* cited by examiner

METHOD FOR COMPENSATING FOR VALVE LIFT DEVIATION BETWEEN ENGINES EQUIPPED WITH CVVL MECHANISM

CROSS-REFERENCE TO RELATED APPLICATION

This application claims priority to and the benefit of Korean Patent Application No. 10-2010-0109400 filed Nov. 4, 2010, the entire contents of which application is incorporated herein for all purposes by this reference.

BACKGROUND OF INVENTION

1. Field of Invention

The present invention relates to a method for compensating for a valve lift deviation between engines equipped with a CVVL mechanism, and more particularly, to a method for compensating for a valve lift deviation by learning the valve lift and adding a learned value so that a pressure measured by a MAP sensor and a modeled MAP value are equal to each other.

2. Description of Related Art

Figure 2:
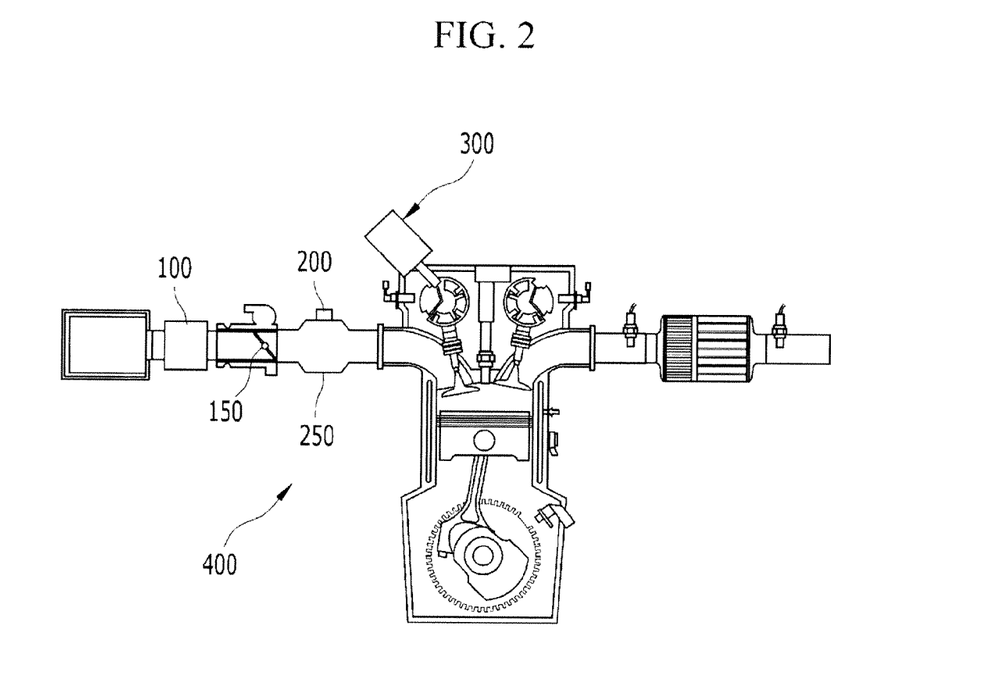
FIG. 2 is a schematic view of the engine equipped with an exemplary CVVL mechanism according to the present invention.

In a method for detecting a flow rate of intake air into a cylinder from an engine equipped with a conventional CVVL (continuous variable valve lift) mechanism, the intake air flow rate is measured by a MAF sensor 100 (see FIG. 2). It is usually necessary to perform correction because the rate of change of the intake air flow rate varies depending on a number of factors including valve overlap.

However, despite the correction, the actual air flow rate and the flow rate of intake air into the cylinder may vary by a number of factors, and this may generates a valve lift deviation between engines.

Figure 1:
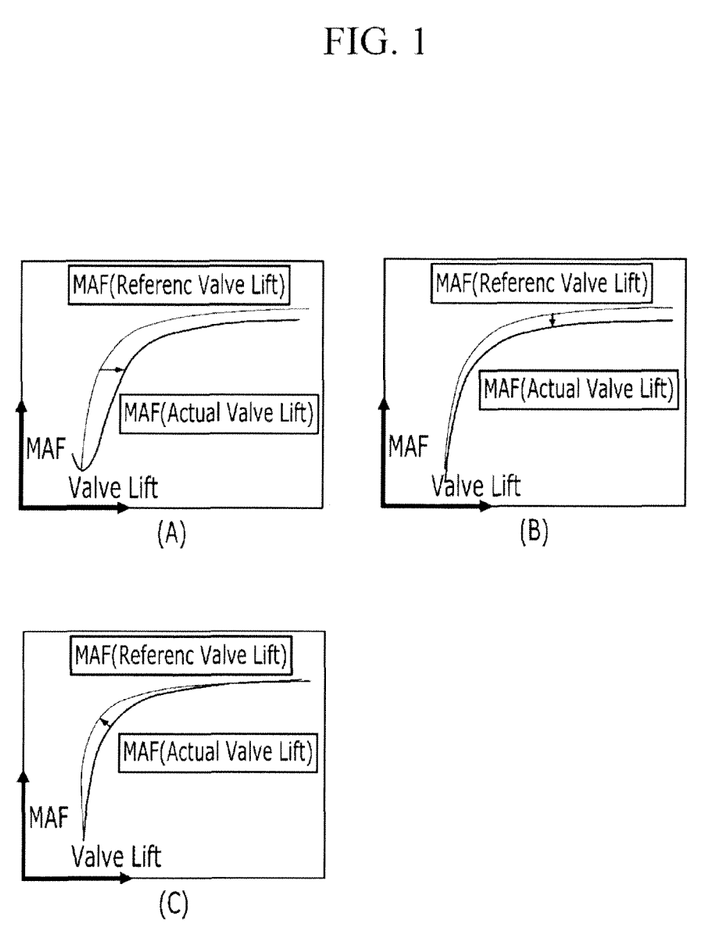
FIG. 1 is a graph of the pattern of valve lift deviation of an engine equipped with a CVVL mechanism.

FIG. 1 illustrates the patterns of valve lift deviation of such an engine equipped with a CVVL mechanism. FIG. 1 is a graph showing the MAF amount depending on the valve lift. The valve lift is measured not directly but indirectly in accordance with an angle of a control shaft. A of FIG. 1 shows the effect of a deviation in the angle of the control shaft, B of FIG. 1 shows the effect of a valve lift deviation, and C of FIG. 1 shows the effect of a combination of factors caused by the simultaneous occurrence of the deviation in the angle of the control shaft and the valve lift deviation. The three types of deviations may occur independently, or simultaneously.

Conventionally, the development of a vehicle with an internal combustion engine has been aimed at increasing the fuel ratio and reducing exhaust gases, and has been focused on improving the efficiency of a vehicle system by reducing the load of accessories, rather than on improving the internal combustion engine. To this end, an engine with a CVVL mechanism is configured such that the pressure of a surge tank depending on the opening degree of a throttle and the intake air flow rate depending on the valve lift are controlled by two load sensors, i.e., a MAF (mass air flow) sensor and a MAP (manifold absolute pressure) sensor.

However, in order to precisely control the intake air flow rate depending on the valve lift, tolerance control is required in terms of hardware of the CVVL system so that an air flow rate deviation between a cylinder and engine of an engine system can be minimized. Moreover, there has been a demand for compensation logic against a deviation that may occur between mass-produced engines within an allowed tolerance.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for a method for compensating for a valve lift deviation between engines, in which an MAF sensor and a MAP sensor employed in a CVVL mechanism are used to learn and compensate for the valve lift deviation caused by a difference between MAP_MDL and MAP_MES based on the air flow rate measured by MAF.

Various aspects of the present invention provide for a method for compensating for a valve lift deviation between engines equipped with a CVVL mechanism, in which the valve lift deviation is compensated for by an MAF sensor for measuring a reference air flow rate and an MAP sensor for measuring the pressure of an intake manifold, including determining whether learning conditions for learning a valve lift deviation are met, after the determination, comparing a value MAP_MES measured by the MAP sensor and a modeled pressure MAP_MDL of a surge tank, if the MAP_MES value and the MAP_MDL value are different, learning the valve lift, and after the learning, calculating the final valve lift by adding the learned value of the valve lift to the basic valve lift characteristics.

The learning conditions according to various aspects of the present invention may include normal operation of MAF sensor, steady state of engine speed, and inactive state of throttle feedback control of intake air flow rate.

The learning of the valve lift according to various aspects of the present invention may include calculating MAP_MDL by a volumetric efficiency equation, and performing feedback control so that the MAP_MDL value follows the MAP_MES value.

The volumetric efficiency equation according to various aspects of the present invention may be MAF_CYL=MAP*(EFF_VOL_SLOP)−(EFF_VOL_OFS), where MAF_CYL indicates the flow rate of intake air into a cylinder, MAP indicates the pressure measured in the surge tank, EFF_VOL_SLOP indicates slope, and EFF_VOL_OFS indicates offset.

The feedback control according to various aspects of the present invention is characterized in that, if the MAP_MES value is less than the MAP_MDL value, the valve lift is changed with an increasing tendency, and if the MAP_MES value is greater than the MAP_MDL value, the valve lift is changed with a decreasing tendency.

The valve lift learning according to various aspects of the present invention may be performed according to a table of the relationship between the valve lift and a control shaft.

EFF_VOL_SLOP according to various aspects of the present invention becomes greater as the valve lift becomes greater, and becomes smaller as the valve lift becomes smaller.

According to various aspects of the present invention, if the learning conditions are not met or the MAP_MES value and the MAP_MDL value are equal, the existing valve lift is used.

As described above, various types of deviations in valve lift can be solved depending on a learned value of valve lift deviation, and the engines can have the same characteristics because a deviation in intake air flow rate can be minimized by learning the valve lift of the engines. Moreover, quality robustness is attained by compensating for a mass deviation between the engines with the CVVL mechanism, and it is possible to cope with changes in the hardware deviations of the CVVL mechanism.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 3:
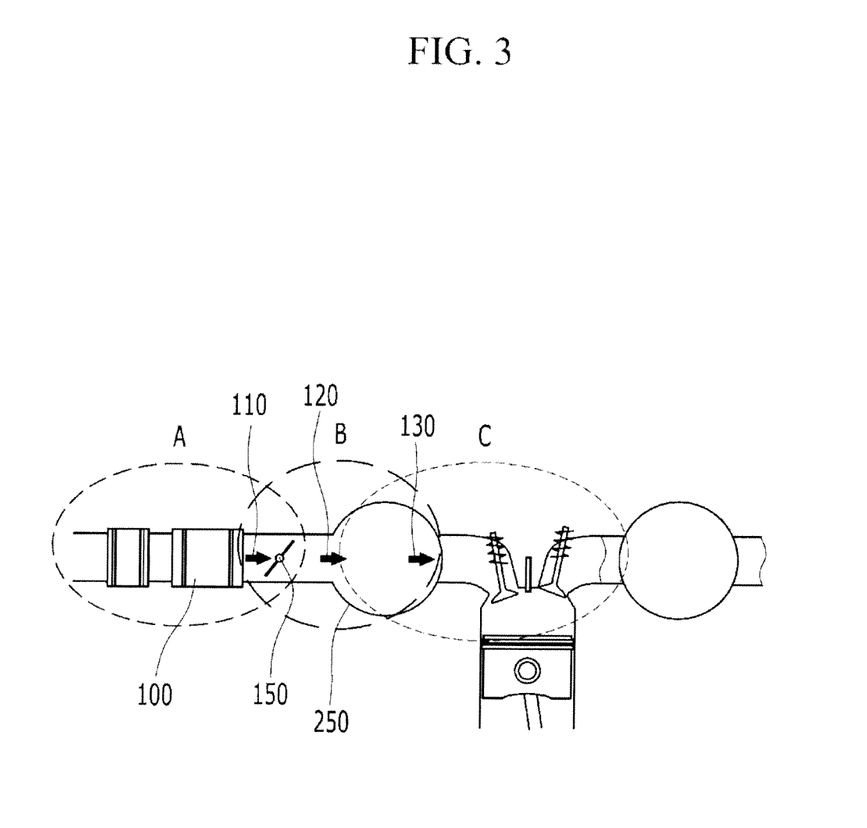
FIG. 3 shows the flow of intake air to an exemplary cylinder according to the present invention.

FIG. 2 is a schematic view of the engine equipped with the CVVL mechanism according to various embodiments of the present invention, which schematically shows mounting positions of an MAF sensor 100 and an MAP sensor 200 and a CVVL system according to the present invention. FIG. 3 shows the flow of intake air into a cylinder according to various embodiments of the present invention.

The present invention relates to a deviation compensation control method, which provides engines with the same characteristics by learning and compensating for a valve lift deviation between the engines. This method is achieved by measuring the intake air flow rate by the MAF sensor 100 installed in an air intake system, measuring the pressure of an intake manifold by the MAP sensor 200 installed on top of a surge tank 250, and then performing feedback control of these values.

FIG. 3 shows the flow of air taken in to a cylinder according to various embodiments of the present invention. It is possible to perform feedback control of the air flow rate passing through a throttle 150 of area B and the flow rate taken intake air into the cylinder of area C based on the air flow rate measured by the MAF sensor 100 of area A in a normal condition.

In the area B, feedback control of the upstream pressure and opening degree of the throttle 150 is performed by a throttle equation, and in the area C, feedback control and learning of the valve lift are performed by using the relationship between the pressure (hereinafter, "MAP_MDL") of the surge tank modeled by a volumetric efficiency equation and the value measured by the MAP sensor (hereinafter, "MAP_MES").

In the above process, the present invention particularly relates to a method of compensation using the difference between MAP_MDL and MAP_MES by the above volumetric efficiency equation based on the air flow rate measured by the MAF sensor 100.

Figure 6:
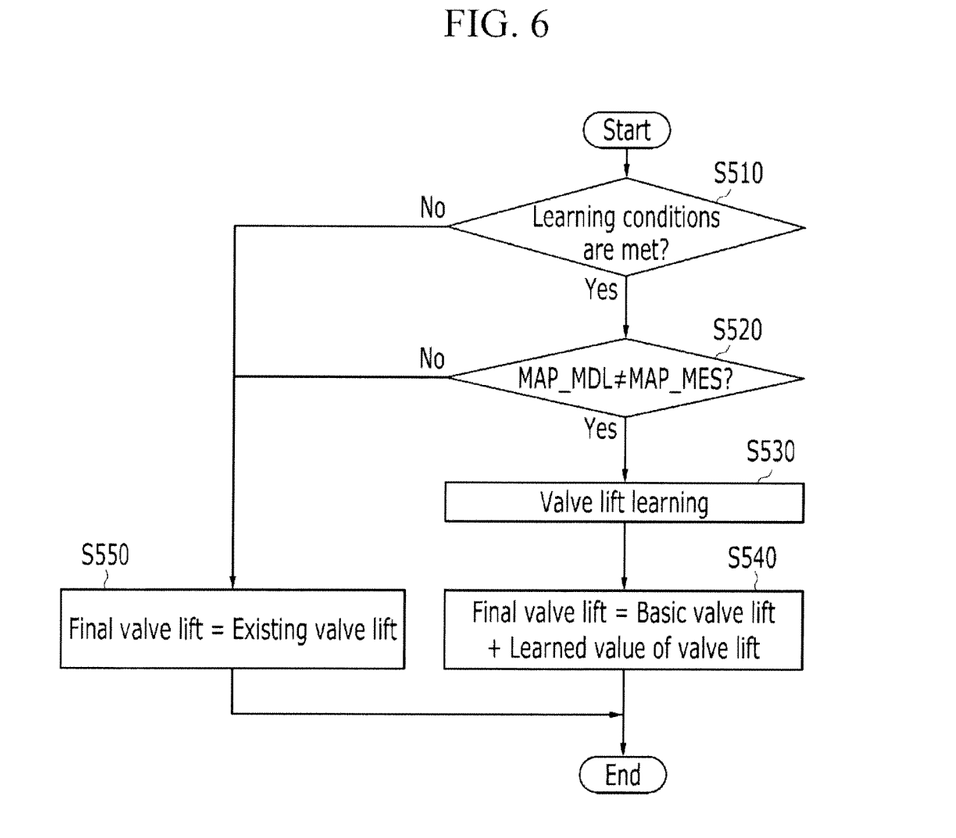
FIG. 6 is a sequential view of an exemplary method for controlling the compensation of a valve lift deviation according to the present invention.

First, it is to be determined whether deviation learning conditions according to the present invention are met (S510)

The deviation learning conditions include normal operation of MAF sensor, steady state of engine speed, steady state of MAF, cooling water temperature below a set value, intake temperature below a set value, passage of a set amount of time after start-up, inactive state of throttle feedback control of intake air flow rate, and setting up of an area in which a valve lift deviation between engines has a significant effect on the intake air flow rate.

The reason for setting up an area in which a valve lift deviation between engines has a significant effect on the intake air flow rate is to perform learning in an area where most traveling takes place.

Moreover, the reason for not performing throttle feedback control is to avoid confusion that may be created when throttle feedback control is performed simultaneously with feedback correction of the difference between MAP_MDL and MAP_MES to be described later. That is, the reference point may vary because the feedback control to achieve the same air flow rate is performed in two locations. Thus, only the valve lift is to be learned.

If the learning conditions are not met, the final valve lift is given the same value as the existing valve lift (S550). This is because it is desirable not to perform learning at this time. The existing valve lift is a value obtained by adding a previously learned value to the basic valve lift.

If all the learning conditions are met, the MAP_MES value and the MAP_MDL value are compared (S520). A deviation between a modeled air flow rate and a measured air flow rate is generated due to a valve lift deviation, resulting in a difference between MAP_MDL and MAP_MES.

If the MAP_MES value and the MAP_MDL value are equal, there is no need to learn the valve lift, and therefore the existing valve lift is used for operation (S550).

However, if the MAP_MES value is different from the MAP_MDL value, the valve lift needs to be learned (S530). As for the learning process, if the MAP_MES value is less than the MAP_MDL value, a valve lift change with an increasing tendency is learned; and in contrast, if the MAP_MES value is less than the MAP_MDL value, a valve lift change with a decreasing tendency is learned, thereby allowing that the MAP-MDL value to follow the MAP_MES value by feedback control.

This is because the smaller the valve lift, the smaller the slope of the volumetric efficiency equation to be described later, and on the contrary, the greater the valve lift, the greater the slope of the volumetric efficiency equation.

After learning is done as above, the final valve lift is calculated by adding the learned value of the valve lift to the basic valve lift characteristics (S540).

If the MAP_MDL value and the MAP_MES value are equal, there is no need to perform learning, and therefore the final valve lift is given the same value as the existing valve lift (S550).

The learning process is performed based on the volumetric efficiency equation. Volumetric efficiency is defined as the ratio of the actual flow rate of intake air into the cylinder to the volume flow rate of intake air having a density at a standard atmospheric state during a cylinder stroke.

Figure 4:
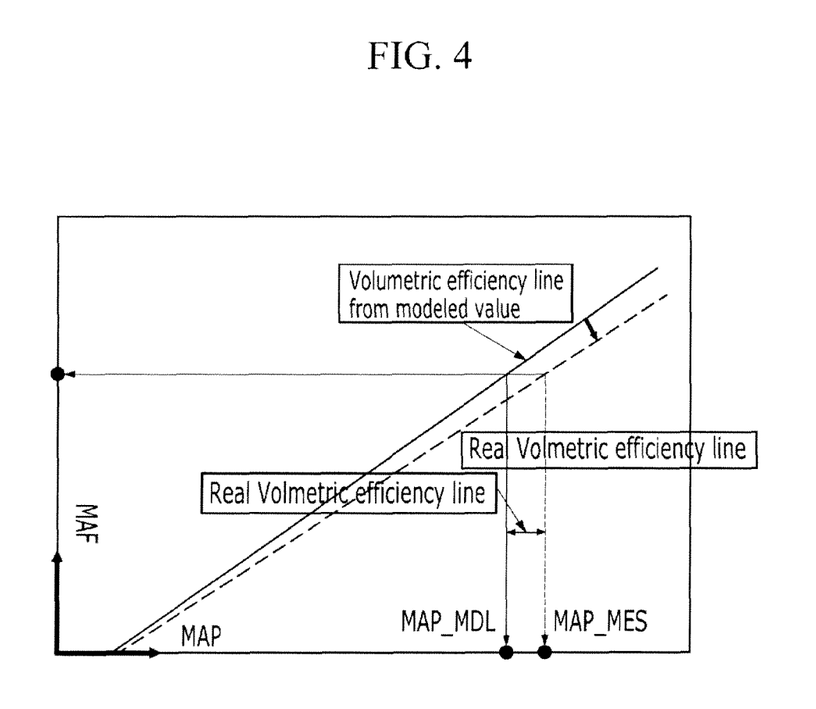
FIG. 4 is a graph of an exemplary volumetric efficiency equation according to the present invention.

The volumetric efficiency is as follows.

$$MAF\_CYL=MAP*(EFF\_VOL\_SLOP)-(EFF\_VOL\_OFS) \quad \text{Equation (1)}$$

In Equation (1), MAF_CYL indicates the flow rate of intake air into the cylinder, and MAP indicates the pressure measured in the surge tank.

EFF_VOL_SLOPE indicates slope. The greater the valve lift, the greater the slope, and the smaller the valve lift, the smaller the slope.

EFF_VOL_OFS indicates offset. The volumetric efficiency equation is a simplified linear relationship characterized by slope and offset between the pressure MAP of the surge tank and the primary function of the flow rate MAF_CYL of air into the cylinder.

A graph of the volumetric efficiency equation is illustrated in FIG. 4. The solid line indicates a modeled volumetric efficiency line, and the dotted line indicates a real volumetric efficiency line. Referring to FIG. 4, it can be seen that the two lines have different MAP values corresponding to the same MAF value. In the present invention, MAP_MDL value is adjusted to be equal to the MAP_MES value. As illustrated in FIG. 4, if the valve lift is reduced, the slope becomes smaller, resulting in making the MAP_MDL value and the MAP_MES value equal to each other.

In the volumetric efficiency equation, EFF_VOL_SLOPE (Volumetric Efficiency Slope) and EFF_VOL_OFS (Volumetric Efficiency Offset) are determined by calculating the flow rate MAF_CYL of intake air in the cylinder depending on MAP_MES during fixed valve overlap by using the linear relationship between the flow rate MAF_CYL of air into the cylinder of an engine operated at steady state and the pressure MAP_MES in the surge tank. In this case, at steady state, the air flow rate 110 measured by the MAF sensor, the air flow rate 120 passing through the throttle, and the air flow rate 130 taken into the cylinder are equal.

EFF_VOL_SLOP and EFF_VOL_OFS mentioned above are basically determined by engine speed, positions of intake and exhaust cams, valve overlap, environmental conditions, etc. However, valve lift as a determining factor of EFF_VOL_SLOP and EFF_VOL_OFS is added to a CVVL engine.

When the valve lift is increased, the intake air flow rate is increased due to an increase in the area between the valve and the valve seat and an increase in the opening duration of the cams; and on the contrary, when the valve lift is reduced, the air flow rate is reduced. Using this characteristic, the model air flow rate MAF_CYL is calculated by EFF_VOL_SLOP and EFF_VOL_OFS for each valve lift, and feedback control is performed based on the air flow rate measured by the MAF sensor 100.

The feedback control is carried out by modifying a valve lift table of the relationship between the control shaft and the valve lift. The valve lift table indicates a table obtained by varying the valve lift depending on the angle of the control shaft.

Figure 5:
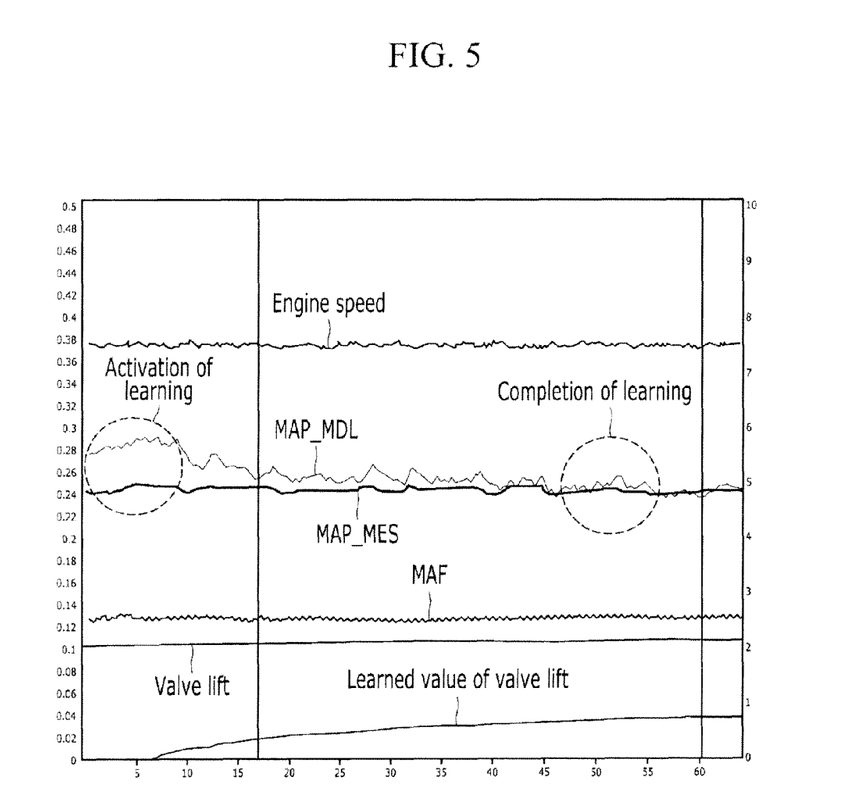
FIG. 5 is a graph showing an exemplary process for learning a valve lift deviation according to the present invention.

FIG. 5 is a graph showing a process for learning a valve lift deviation according to various embodiments of the present invention, in which a learning logic is put in operation due to a difference between the MAP_MDL value and the MAP_MES value to add a learned value of the valve lift, and the learning is completed when the MAP_MDL value and the MAP_MES are made equal. At this time, the valve lift was maintained at a predetermined level, and feedback control was performed based on the MAF value after the learning.

As described above, the direction of a change in the valve lift table is learned by comparing the MAP_MES value and the MAP_MDL value and varying the MAP_MDL value to follow the MAP_MES value. After learning is done as above, the final valve lift is calculated by adding the learned value of the valve lift to the basic valve lift (S540).

In this way, if there is a difference in volumetric efficiency, valve lift learning is performed, and thereafter a deviation in valve lift between the engines is learned by performing feedback correction so that the condition MAP_MDL=MAP_MES is met, that is, MAP_MDL follows MAP_MES.

As discussed above, in various embodiments of the present invention, a difference in intake air flow rate caused by a difference between MAP_MDL and MAP_MES is calculated, and a valve lift deviation is calculated by a controller so that the difference in intake air flow rate equals zero, that is, the condition MAP_MDL=MAP_MES is met.

The final deviation in air flow rate is compensated for by applying a learned value of the calculated valve lift deviation to the valve lift table.

By doing so, various types of deviations in valve lift can be solved by compensating for a valve lift deviation between engines, and the engines can have the same characteristics because a deviation in intake air flow rate is minimized by learning the valve lift of the engines. Moreover, the quality of an engine equipped with a CVVL mechanism can be improved by compensating for a deviation in the engine with the CVVL mechanism.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method for compensating for a valve lift deviation of an engine equipped with a continuous variable valve lift (CVVL) mechanism, in which the valve lift deviation is compensated for by a mass air flow (MAF) sensor for measuring a reference air flow rate and a manifold absolute pressure (MAP) sensor for measuring the pressure of an intake manifold, comprising:

determining whether learning conditions for learning a valve lift deviation are met;

after the determination, comparing a value MAP_MES measured by the MAP sensor and a modeled pressure MAP_MDL of a surge tank calculated based on an air flow rate measured by the MAF sensor;

if the MAP_MES value and the MAP_MDL value are different, learning the valve lift; and after the learning, calculating the final valve lift by adding the learned value of the valve lift to a stored basic valve lift characteristics;

wherein the learning conditions include a normal operation of MAF sensor, a steady state of engine speed, and an inactive state of throttle feedback control of intake air flow rate.

2. The method of claim 1, wherein the learning of the valve lift comprises:
- calculating MAP_MDL by a volumetric efficiency equation; and
- performing feedback control so that the MAP_MDL value follows the MAP_MES value.

3. The method of claim 2, wherein the volumetric efficiency equation is $$MAF\_CYL = MAP*(EFF\_VOL\_SLOP) - (EFF\_VOL\_OFS)$$

where MAF_CYL indicates the flow rate of intake air into a cylinder, MAP indicates the pressure measured in the surge tank, EFF_VOL_SLOP indicates slope, and EFF_VOL_OFS indicates offset.

4. The method of claim 2, wherein the feedback control is characterized in that, if the MAP_MES value is less than the MAP_MDL value, the valve lift is changed with an increasing tendency, and if the MAP_MES value is greater than the MAP_MDL value, the valve lift is changed with a decreasing tendency.

5. The method of claim 1, wherein the valve lift learning is performed according to a table of the relationship between the valve lift and a control shaft.

6. The method of claim 3, wherein EFF_VOL_SLOP becomes greater as the valve lift becomes greater, and becomes smaller as the valve lift becomes smaller.

7. The method of claim 1, wherein, if the learning conditions are not met or the MAP_MES value and the MAP_MDL value are equal, the existing valve lift is used.

\* \* \* \* \*